United States Patent [19]

Lundman

[11] Patent Number: 4,565,222

[45] Date of Patent: Jan. 21, 1986

[54] INFLATABLE APPARATUS FOR USE IN PLUGGING A LARGE DIAMETER PIPE

[76] Inventor: Philip L. Lundman, 3631 Fredonia-Kohler Rd., Fredonia, Wis. 53021

[21] Appl. No.: 730,246

[22] Filed: May 3, 1985

Related U.S. Application Data

[63] Continuation of Ser. No. 522,206, Aug. 11, 1983, abandoned.

[51] Int. Cl.⁴ ............................................. F16L 55/12
[52] U.S. Cl. ......................................... 138/93; 138/89; 138/40; 138/45; 138/46; 137/318; 137/355.16; 312/242
[58] Field of Search ............... 138/89, 93; 134/167 C; 4/255; 137/315, 318, 355.16, 355.28; 312/242; 248/75, 92; 169/51

[56] References Cited

U.S. PATENT DOCUMENTS

| | | | |
|---|---|---|---|
| 1,180,182 | 4/1916 | Petersen | 138/93 |
| 2,753,876 | 7/1956 | Kurt | 138/93 X |
| 2,755,810 | 7/1956 | Kurt | 134/167 C |
| 3,357,193 | 12/1967 | Fitzgibbon | 138/93 X |
| 3,714,951 | 2/1973 | Lundman | 134/167 C |
| 4,006,948 | 2/1977 | Kessinger | 137/355.16 |
| 4,250,609 | 2/1981 | Beaudoin | 138/93 X |
| 4,380,269 | 4/1983 | Petaway et al. | 137/355.28 X |
| 4,458,721 | 7/1984 | Yie et al. | 138/93 |

FOREIGN PATENT DOCUMENTS

| | | | |
|---|---|---|---|
| 1109301 | 1/1956 | France | 138/93 |
| 681448 | 10/1952 | United Kingdom | 138/93 |

*Primary Examiner*—James E. Bryant, III
*Attorney, Agent, or Firm*—Michael, Best & Friedrich

[57] ABSTRACT

An inflatable plug adapted to be inserted into a pipe and inflated so as to plug the pipe and form a water tight seal. The inflatable plug is comprised of an inflatable bag of flexible sheet material forming an elongated cylinder having opposite ends. The material at the opposite ends of the cylinder is pleated or folded and wrapped around cylinders. Metal collars are placed over the folded material and swaged so as to clamp the material in fluid tight relation against the cylinders.

1 Claim, 9 Drawing Figures

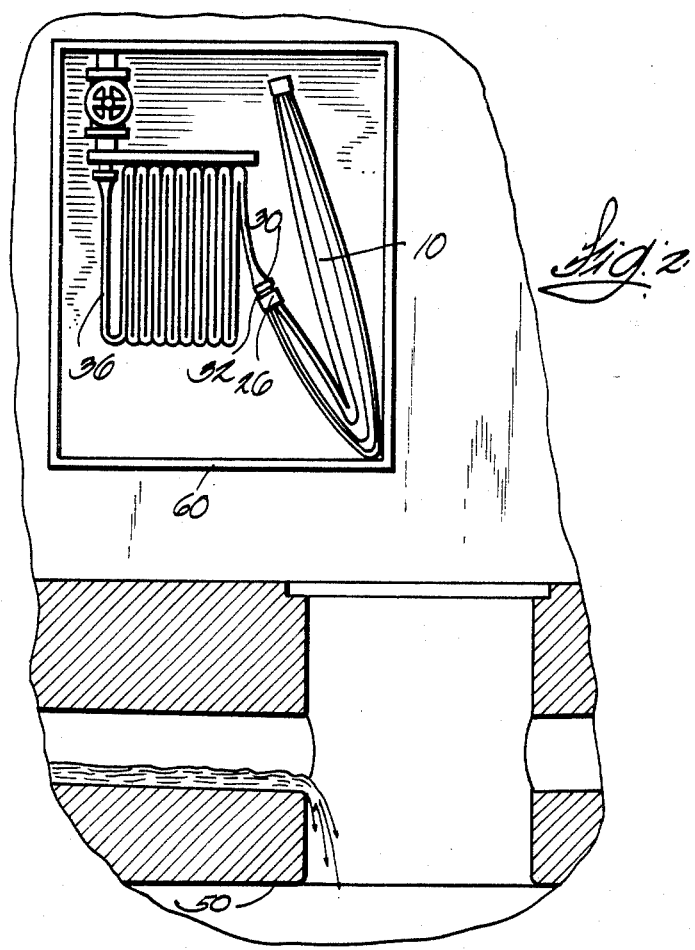
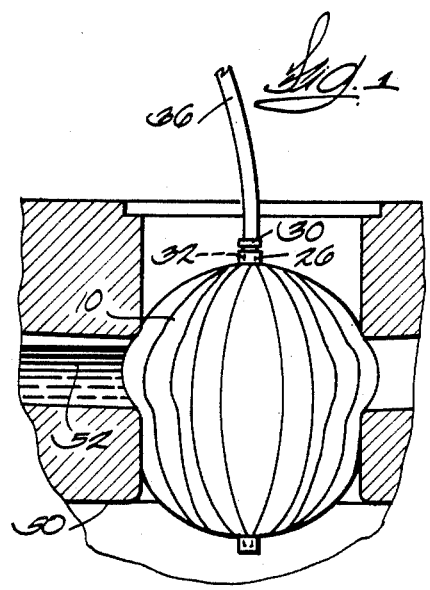
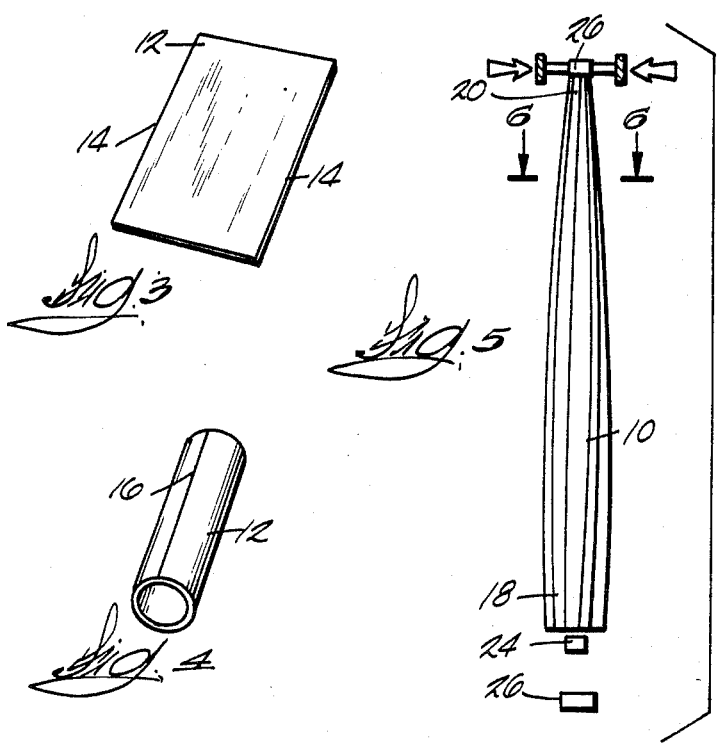

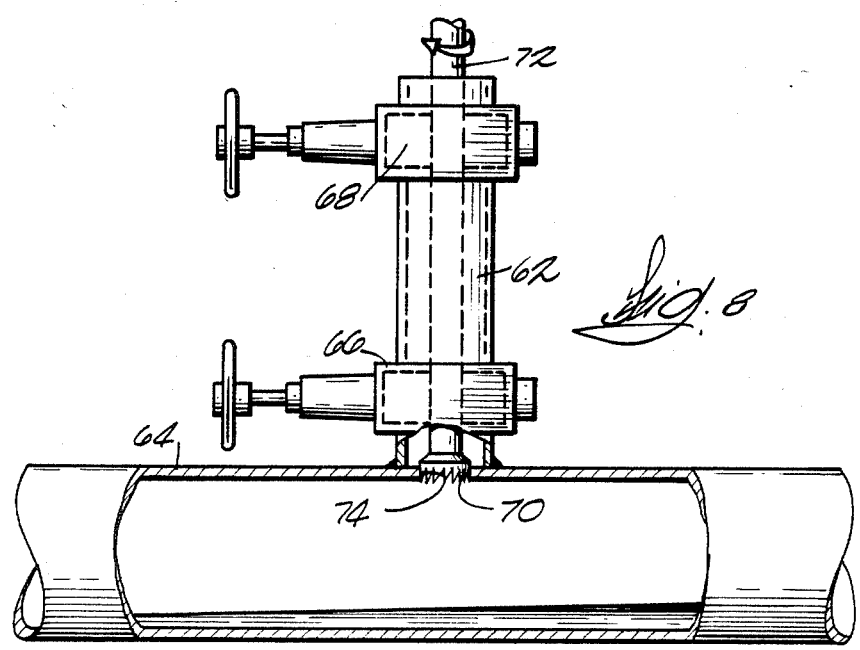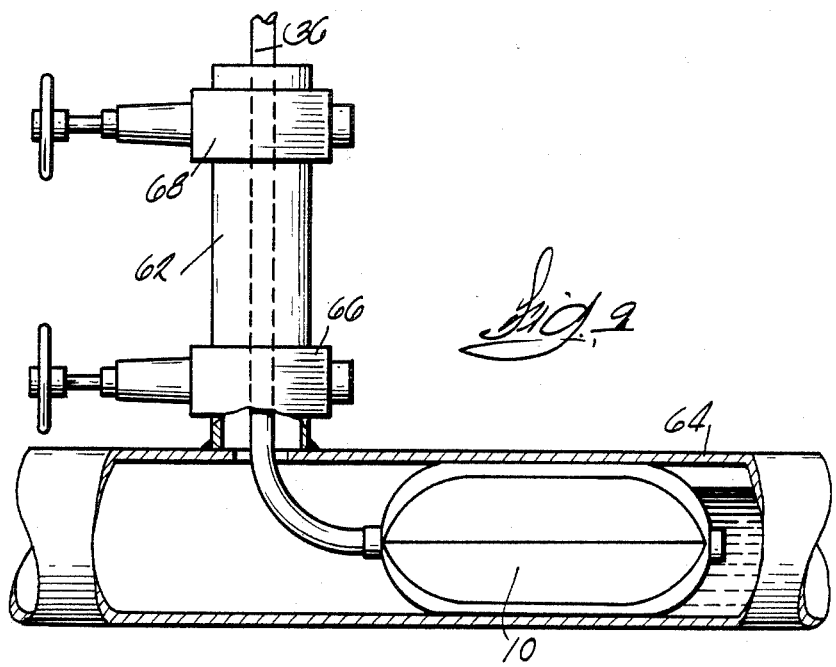

INFLATABLE APPARATUS FOR USE IN PLUGGING A LARGE DIAMETER PIPE

This is a continuation of application Ser. No. 522,206, filed Aug. 11, 1983, now abandoned.

FIELD OF INVENTION

The invention relates to a method and apparatus for use in sealing a pipe to preclude fluid flow through the pipe. More particularly, the invention relates to inflatable plugs adapted to be inserted into pipelines or sewer lines to plug the pipe and thereby permit maintenance or permit clean up of a waste spill.

BACKGROUND PRIOR ART

The prior art means for plugging a pipeline such as a sewer line to permit maintenance of the sewer line or cleanup of a waste spill includes the use of inflatable rubber pillows or cylinders which are inserted into the pipeline and inflated with air so that they will fill the pipeline and function as a plug.

One of the prior art inflatable plug constructions includes an inflatable heavy cylindrical rubber plug having a size only slightly less than the internal diameter of the pipe adapted to be plugged. Such inflatable rubber plugs are inserted into a pipeline or sewer line and then connected to a source of air pressure so that they inflate slightly to fill the pipe. One of the uses of inflatable plugs is in the handling of liquid waste accidents. In the event of a liquid waste spill, an inflatable plug can be inserted into a sewer line to prevent the liquid waste from entering the sewer system. The liquid waste can then be pumped into a proper holding vessel and disposed of.

Another use of inflatable plugs is in connection with repair of broken sewer lines, water lines, or other pipes. The plugs can be inserted into the sewer lines or water lines upstream of the break to thereby block that pipe and permit repair of the break.

Because of the wide variety of sizes of sewer pipes or water pipes, if inflatable plugs are to be used, it is necessary to have on hand a number of plugs of varying sizes.

Another drawback of the prior art inflatable plugs is that they are relatively large when compared to the size of the pipes being plugged, and they are also comprised of relatively inflexible material such that they may be difficult to insert into the pipe. For example, in the case of a horizontal pipe it may be necessary to insert the plug vertically downwardly through a manhole and then turn the plug 90° such that it can be inserted horizontally into a pipe. Due to the large size and relative inflexibility of the prior art inflatable plugs, such manipulation of the plugs may be difficult, particularly in the case of a liquid waste spill where time is essential.

One form of prior art plug is a pipe and sewer sealing bag manufactured by Vetter, Zuelpich, West Germany.

Attention is also directed to the pillow shaped inflatable pipeline plugs manufactured by Circle Gas & Manufacturing Co., Scranton, Pa.

Attention is further directed to applicant's U.S. Pat. No. 3,714,951 showing an inflatable drain cleaner for use in using water pressure to remove an obstruction from a clogged drain. Other related devices are shown in the Anderson U.S. Pat. No. 3,086,540; the Lasting U.S. Pat. No. 3,075,535; and the Amet U.S. Pat. No. 1,308,469.

SUMMARY OF THE INVENTION

The present invention provides an inflatable bag for use in pipelines, sewer pipes and the like, the inflatable bag being useful in sealing pipes of a broad range of sizes. The inflatable bag embodying the invention is easier to insert into a pipe than prior art inflatable plugs wherever desired and can be quickly inserted and quickly inflated to form a fluid tight seal.

More particularly, the present invention comprises an inflatable bag adapted to be inserted into a pipe and inflated so as to plug the pipe and form a water tight seal. The inflatable bag includes an elongated cylinder comprised of at least one thin flexible sheet of fluid impermeable material. The material forming one end of the cylinder is pleated or folded and the folds of material are wrapped around a cylindrical plug. A metal band is placed around the folded wrapped material and is then swaged to clamp together the flexible material forming that end of the cylinder to form a fluid tight closure at the end of the cylinder. Means are also included for providing a connection between a source of fluid pressure and the inflatable bag. This means includes a coupling. The material forming the other of the opposite ends of the inflatable bag is also pleated or folded and the folds of material are wrapped around a portion of the coupling. A metal band is placed around the folds of material and then swaged so as to clamp the folds of material tightly to the coupling to form a fluid tight seal between the flexible material and the coupling.

One of the principal advantages of the present invention is that the inflatable bag embodying the invention can be employed in pipes having an internal diameter only slightly greater than the size of the coupling or crimped ends of the inflatable plug. On the other hand, the plug can be inflated to fill a much larger pipe or sewer. Accordingly, it is necessary to keep only one inflatable plug on hand for use in a variety of pipes. For example, a manufacturer can be prepared to handle liquid waste spills by keeping a single inflatable plug at ready rather than a large number of plugs, one for each size of pipe. Additionally, the deflated bag requires substantially less storage space than prior art inflatable plugs.

Another advantage of the inflatable bag embodying the invention is that it is very flexible and can be easily inserted into a pipe or sewer. Unlike the relatively bulky prior art structures it can also be inserted into a pipe or sewer even if the pipe or sewer is curved or includes a bend.

Another feature of the invention is that the inflatable bag embodying the invention can be inflated with water or air. In one preferred form of the invention the coupling of the inflatable bag can be constructed so as to facilitate connection of the bag to a fire hose. The deflated and flexible bag can be conveniently stored in a fire locker of the type commonly used to contain a fire hose. In the event of a waste spill or pipe breakage, the inflatable bag can be connected to the fire hose, inserted into the sewer or pipe and then inflated. Due to the large volume of water which can be delivered by the fire hose, the inflatable bag can be filled more quickly than is possible with prior art apparatus which have to be connected to an air compressor.

The invention also includes a method for sealing a pipe to permit repair of the pipe or repair of valves, this method including the steps of inserting one or more inflatable plugs into the pipe to cut off fluid flow through the pipe to isolate a portion of the pipe.

In another application of the inflatable bag embodying the invention, it can also be partially inflated to permit flow of a controlled amount of fluid through a pipeline, sewer line, etc. The flow through the pipe can be varied by adjusting the water or air pressure supplied to the inflatable bag.

Various other features and advantages of the invention will be apparent by reference to the following description of a preferred embodiment, by reference to the drawings, and by reference to the claims.

BRIEF DESCRIPTION OF THE DRAWINGS

FIG. 1 is an elevation view showing an inflatable bag embodying the invention housed in a pipe opening and inflated so as to plug the pipe.

FIG. 2 is an elevation view showing the inflatable bag of FIG. 1 in an uninflated state and housed in a stored condition.

FIG. 3 is a perspective view of fabric material used to form the inflatable bag illustrated in FIG. 1.

FIG. 4 is a view similar to FIG. 3 but showing the lateral edges of the fabric material joined.

FIG. 5 is an exploded elevation view illustrating assembly of the inflatable bag shown in FIGS. 1 and 2.

FIG. 6 is an enlarged cross section view taken along line 6—6 in FIG. 5.

FIG. 7 is an enlarged cross section view of the flexible material forming the inflatable bag shown in FIGS. 1-6.

FIGS. 8 and 9 illustrate a method for plugging a pipe using the inflatable bag.

DESCRIPTION OF A PREFERRED EMBODIMENT

Illustrated in FIG. 1 is an inflatable bag 10 embodying the invention. In a preferred form of the invention the inflatable bag is comprised of a large sheet of flexible material 12 (FIG. 3) which is nonpermeable by air and water and which is also tear and abrasion resistant. While this flexible sheet could comprise various materials having these properties, suitable materials include Surlyn, plastic sheet vinyl, urethane or fabric impregnated with neoprene. Surlyn is a trademark of Dow Chemical Company. The inflatable bag 10 can also be comprised of one or more thicknesses, layers or plies of material depending on the materials used and the wear and abrasion resistance required and the pressure to which the bag will be subjected in the particular application of the inflatable bag.

In a preferred form of the invention an elongated rectangular sheet 12 of flexible material will be cut. The sheet 12 of material is folded so as to form a large cylinder as shown in FIG. 4, and the elongated edges 14 of the rectangular sheet 12 of material are joined together and sealed to form a fluid tight seam 16. If the sheet 12 comprises a material such as vinyl, in a preferred form of the invention the edges 14 can be sealed together using a conventional ultra sonic or heat sealing apparatus.

The material forming one of the opposite ends 18 and 20 of the bag 10 is then folded to form a number of pleats 22 extending parallel to the longitudinal axis of the bag. These pleats at one end of the bag are folded over on top of each other and then wrapped around a solid cylindrical metal plug 24 as shown in FIG. 5.

Means are also provided for clamping the wrapped pleats or folds of material 22 against the solid cylindrical plug 24 such that a fluid tight joint is formed at the end of the bag 10. In a preferred form of the invention, an aluminum or other relatively soft metal sleeve 26 is slipped over the wrapped pleated end of the bag, and the aluminum sleeve 26 is then swaged such that it is reduced in diameter and will clampingly engage the material forming the end of the bag to thereby form a fluid tight joint between that material and the cylindrical plug 24.

The opposite end of the inflatable bag 10 is similarly pleated and surrounded by an aluminum band 26 swaged so as to clamp the material together around a metal tube or pipe 32 of a coupling to be described below.

Means are also included for connecting or coupling the inflatable bag 10 to a source of fluid pressure. While this means for connecting could have various construction, in the illustrated arrangement it includes a metal tube or pipe 32 adapted to be surrounded by the pleated material, the pleated material being clamped against the pipe or sleeve 32 by the collar 26. The pipe or sleeve 32 includes a free end projecting from the inflatable bag 10, the free end including a socket or coupling member 30 adapted to facilitate connection of a fluid pressure source to the inflatable bag. For purposes of example, and not by way of limitation, the socket or coupling member 30 can be constructed so as to be connected to the end of a fire hose 36. In other embodiments the coupling could have other constructions so as to be adapted to be connected to another source of fluid pressure. For example, the coupling could comprise a conventional quick disconnect coupling commonly used to join air hoses.

While the inflatable bag 10 described above could be comprised of a single layer of flexible material, in alternative embodiments of the invention, it could be comprised of two or more plies of flexible material. For example, as illustrated in FIG. 7 a layer of neoprene impregnated fabric 40 could be bonded to the sheet of material 12 to function as a backing layer or cover layer of material to provide increased resistance to cutting, abrasion or wear.

FIG. 1 illustrates the use of an inflatable bag 10 embodying the invention to plug a sewer line 50 to prevent the flow of liquid waste material 52 into the sewer line 50. The inflatable bag 10, in a collapsed state is inserted into the sewer line and then connected to a fire hose 36 so as to be inflated. The water pressure from the fire hose 36 is sufficient to provide a very tight fit in the pipe and thereby precludes fluid flow. In the case of an industrial liquid spill or the like, a pump can then be employed to pump the liquid waste 52 into a suitable holding tank so that it can be properly disposed of.

As shown in FIG. 2, one of the features of the inflatable bag 10 embodying the invention is that in its collapsed state it is conveniently housed in a locker 60 of the type commonly used to contain a fire hose 36. In the event of a waste spill, the inflatable bag 10 can be quickly employed to prevent flow of waste into a sewer system.

FIGS. 8-9 illustrate a method for plugging a pipe using the inflatable plug 10 embodying the invention and in order to facilitate repair of a portion of a pipe or removal or repair of a valve in the pipe.

As illustrated in FIG. 8 a first pipe stub 62 is welded to the pipe 64 being repaired. The first pipe 62 includes a pair of spaced apart gate valves 66 and 68, one valve 66 located adjacent the pipe 64 being repaired and the second valve 68 spaced from the first gate valve 66. The lower or first gate valve 66 is closed and a machine bit 70 is then inserted through the second valve 68. The second valve 68 is then closed leaving only the elongated shaft 72 of the bit exposed. The first valve 66 is then opened to permit the machine bit 70 to cut an opening 74 in the wall of the main pipe 64. The machine bit 70 is then withdrawn and the first valve 66 is closed. The second valve 68 is then opened and the machine bit 70 removed from the pipe 64.

The inflatable bag 10 is then inserted into the pipe 62. The second valve 68 is then closed such that only the hose 36 connected to the inflatable bag projects through the valve 68.

The first valve 66 can then be opened and the inflatable bag 10 can be pushed into the main pipe 64. The bag 10 is then inflated to plug the pipe 64.

A second hot tap can be mounted on the pipe downstream of the main valve and a second inflatable bag inserted into the main pipe. Both inflatable bags can then be inflated to seal off the area of the pipe including the valve, and the valve can then be removed from the pipe and replaced. Once the valve or break in the pipe has been replaced, the inflatable bags are deflated and pulled out of the pipe. The first valves of each hot tap are then closed to seal the pipe. The second valve of each hot tap can then be opened and the inflatable bags can then be removed from the hop taps.

Various features of the invention are set forth in the following claims.

I claim:

1. Apparatus for use in plugging a large diameter pipe for preventing flow of water through the large diameter pipe, the apparatus comprising:
   a locker adapted to house an elongated fire hose and an inflatable bag,
   a hose having opposite ends, said hose being housed in said locker, one of said opposite ends being connected to a source of water pressure, and
   an inflatable bag housed in said locker, said inflatable bag being adapted to be connected to the other of said opposite ends of said hose and being adapted to be removed from said locker and inserted into the large diameter pipe wherein said inflatable bag can be inflated in the large diameter pipe and maintained in an inflated state in the large diameter pipe so as to plug the large diameter pipe and form a water tight seal therein, the inflatable bag including opposite ends and a longitudinal axis, said inflatable bag being comprised of at least one large sheet of thin flexible fluid impermeable material, said large sheet of material including parallel edges, said edges being sealed together to form a fluid tight seam extending substantially parallel to said longitudinal axis, and said material forming a plurality of folds parallel to said longitudinal axis, and said inflatable bag being sufficiently flexible that when said inflatable bag is deflated, said inflatable bag can be freely folded in a direction transverse to said longitudinal axis, said plurality of folds at one of said opposite ends of said inflatable bag being wrapped around said longitudinal axis in a spiral configuration when viewed in cross sections generally perpendicular to said longitudinal axis, and a first collar surrounding the flexible material forming said plurality of folds spirally wrapped around said longitudinal axis at said one of said opposite ends, and clampingly engaging said flexible material to form a fluid closure at said one of said opposite ends, means for providing a connection between the other of said opposite ends of said hose and said inflatable bag, said means for providing a connection including a coupling, said plurality of folds at the opposite end of said inflatable bag being wrapped around the longitudinal axis in a spiral configuration when viewed in cross section generally perpendicular to said longitudinal axis, and a second collar surrounding said plurality of folds of material spirally wrapped around said longitudinal axis and forming said opposite end of said inflatable bag and clampingly engaging said flexible material forming said opposite end to form a fluid tight seal between said plurality of folds of flexible material and said coupling, and said elongated flexible bag having a diameter when said elongated flexible bag is inflated substantially larger than the diameter of said elongated flexible bag when said elongated flexible bag is deflated.

* * * * *